United States Patent [19]

Lubieniecki

[11] 4,194,523

[45] Mar. 25, 1980

[54] LOADING AND UNLOADING VALVES

[75] Inventor: Eugene Lubieniecki, Blue Island, Ill.

[73] Assignee: North American Car Association, Chicago, Ill.

[21] Appl. No.: 838,639

[22] Filed: Oct. 3, 1977

[51] Int. Cl.² .............................................. F16K 1/02
[52] U.S. Cl. ................................. 137/238; 137/800; 251/144; 251/291
[58] Field of Search ............... 137/238, 383, 797, 800; 251/144, 278, 291

[56] References Cited

U.S. PATENT DOCUMENTS

| | | | |
|---|---|---|---|
| 1,171,706 | 2/1916 | Crabtree | 251/144 X |
| 1,278,813 | 9/1918 | Weaver | 137/797 X |
| 1,301,729 | 4/1919 | Mittinger | 251/144 |
| 1,529,290 | 3/1925 | Beasley | 137/800 |
| 1,633,642 | 6/1927 | Kramer | 137/797 X |
| 2,092,926 | 9/1937 | Lithgow | 251/144 X |
| 3,610,572 | 10/1971 | Swearingen | 251/144 |
| 3,656,710 | 4/1972 | Shaw | 251/144 |
| 3,678,955 | 7/1972 | Nelson | 137/238 |
| 3,714,956 | 2/1973 | Nelson | 137/238 |
| 3,981,481 | 9/1976 | Reedy et al. | 137/797 X |
| 4,016,907 | 4/1977 | Rawstrom | 251/144 X |
| 4,056,117 | 11/1977 | Deeks | 251/144 X |
| 4,121,614 | 10/1978 | Reedy | 251/144 X |
| 4,137,937 | 2/1979 | Reedy | 137/800 UX |

FOREIGN PATENT DOCUMENTS 885797 12/1961 United Kingdom ...................... 251/144
905071 9/1962 United Kingdom ...................... 251/144

Primary Examiner—Gerald A. Michalsky
Attorney, Agent, or Firm—Allegretti, Newitt, Witcoff, & McAndrews

[57] ABSTRACT

An easily sterilizable, low profile loading and unloading valve for mounting at the bottom of a tank includes a flange which is mounted adjacent to an opening in the bottom of the tank. A chamber extends through the flange, and a valve plug is mounted to one of the surfaces of the flange and extends into the tank opening. The valve plug normally closes the chamber in the flange, but is moveable to a position in which the chamber is opened to the tank. A cap is mounted to the other surface of the flange and closes the chamber. This cap may, alternatively, either take the form of a closure plate which closes the chamber during transport of the tank, or an adapter assembly which is mounted to the flange and which includes a connector for a loading and unloading conduit and a threaded biasing member for biasing the valve plug from its closed to its opened position.

10 Claims, 7 Drawing Figures

LOADING AND UNLOADING VALVES

BACKGROUND AND SUMMARY OF THE INVENTION

This invention relates to loading and unloading valves and, more particularly, to sterilizable, low profile loading and unloading valves for tank vehicles.

Many lading materials, such as food products, including tomato paste, sugar solutions, etc., must be shipped under sterilized conditions. Moreover, after unloading of these materials, the shipping vessel must again be sterilized either or both prior to the return of the vessel for refilling, or just prior to refilling by the food product manufacturer.

The loading and unloading valves of the present invention have a principal purpose of insuring such sterile conditions, both during loading and unloading of the perishable lading, as well as during transport. The loading and unloading valves of the present invention minimize the possibility of damage to the cargo and inadvertent loss of the cargo or ingress of contaminants during shipment, due to damage to the valve during transport. The loading and unloading valves of the present invention are preferably mounted inside of the vessel in a protected location to prevent damage to the valve during shipment and to maintain its cleanliness. Yet, the loading and unloading valves of the present invention may be fully operated from outside of the shipping vessel and from its bottom, thereby avoiding the need for dock personnel to climb to the top of the shipping vessel. Moreover, the loading and unloading valves of the present invention may be quickly and easily disassembled from either inside or outside the vessel, and may be easily bench worked for maintenance and cleaning. The loading and unloading valves of the present invention present an extremely low profile and minimum projection from the vessel, and the valve operating adapter need not be mounted to the valve during shipment. Even if the valve operating adapter is inadvertently left attached and shipped with the vessel and is damaged during transport, such as completely sheared off, the valves of the present invention will remain seated and contain the lading to prevent inadvertent loss during shipment. The loading and unloading valves of the present invention are simple in construction and have a minimum number of parts, thereby reducing the expense of both manufacture and maintenace, and making the valves more easily sterilizable. The loading and unloading valves of the present invention also, preferably, include a chamber between the lading and the exterior of the valve which may be filled with a sterilizing solution during transit to prevent the ingress of contaminants to the lading. Finally, the loading and unloading valves of the present invention are constructed and arranged such that the valve is guided between its open and closed positions so as to minimize the possibility that the valves will become stuck during loading or unloading of the cargo.

In a principal aspect of the present invention, a loading and unloading valve for a tank comprises flange means, mounting means for mounting the flange means adjacent an opening in the tank, a chamber in the flange means extending through the flange means and opening to opposite surfaces of the flange means, valve plug means mounted to one of the surfaces for movement into a first position in which the valve plug means normally closes the opening in the flange means at the one surface, and to a second position in which the valve plug means opens that opening, the valve plug means extending from the flange means toward the opening in the tank when the flange means is mounted adjacent to the opening, cap means, and mounting means for removably mounting the cap means adjacent the other surface of the flange means in covering relationship to the chamber and the opening in the other surface of the flange means.

In another principal aspect of the present invention, the cap means may, alternatively, comprise either plate means for closing the chamber, or adapter means comprising a connector for connecting a material handling conduit to the chamber and biasing means for moving the valve plug means to the open position when the adapter means is mounted on the flange means.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figure 1:
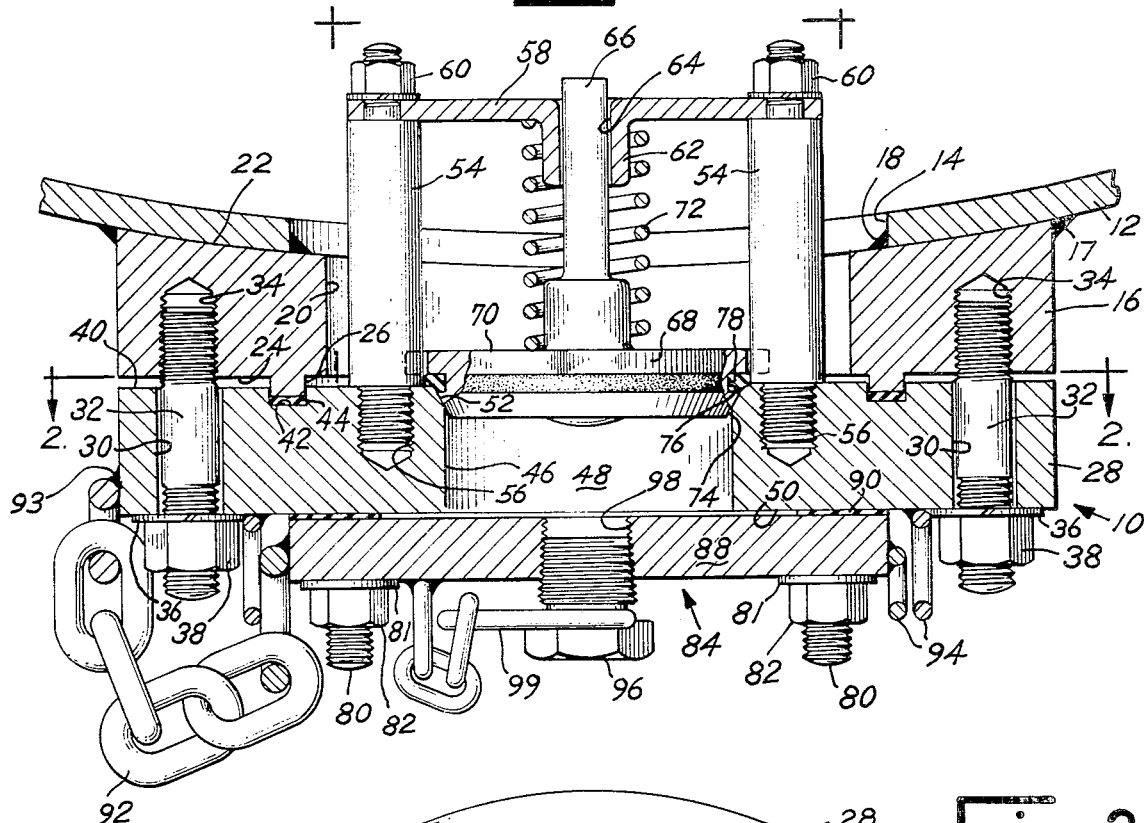
FIG. 1 is a cross sectioned elevation view of a portion of a transport tank or vessel and one preferred embodiment of loading and unloading valve constructed in accordance with the principles of the invention, and in which the valve is shown with a transport plate installed during transport.
Figure 2:
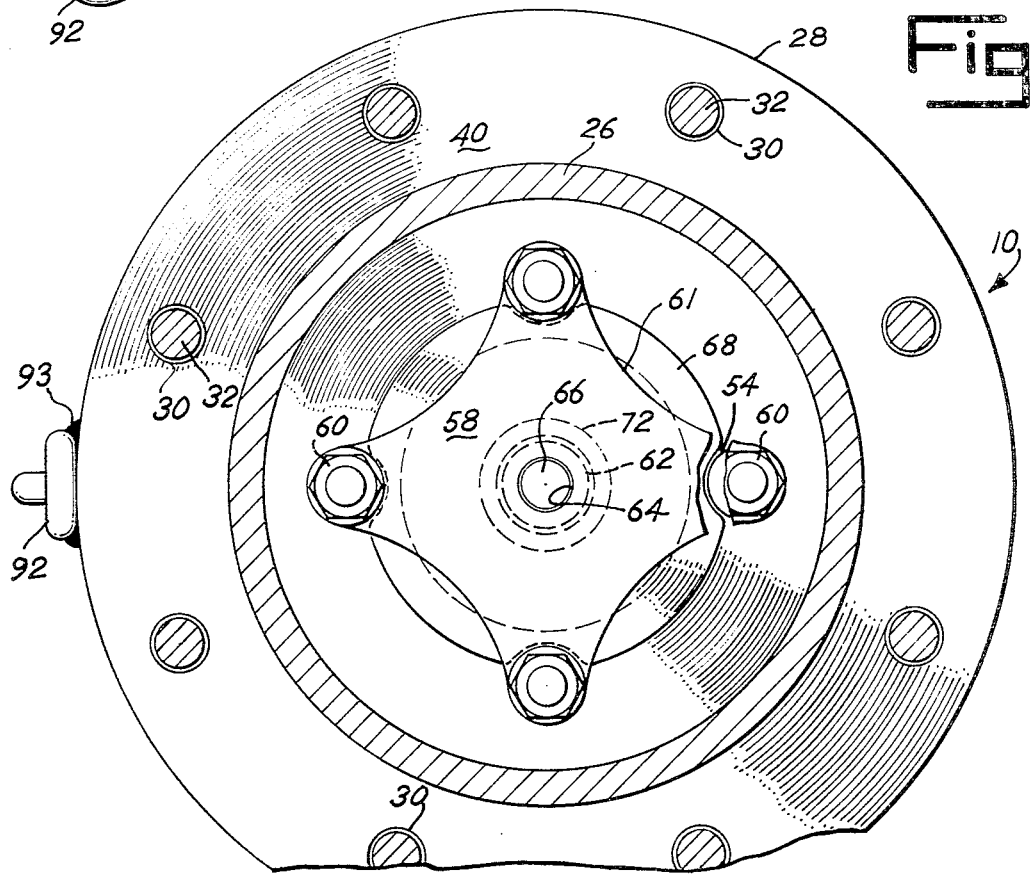
FIG. 2 is a cross sectioned plan view of the valve as viewed along line 2—2 of FIG. 1.
Figure 3:
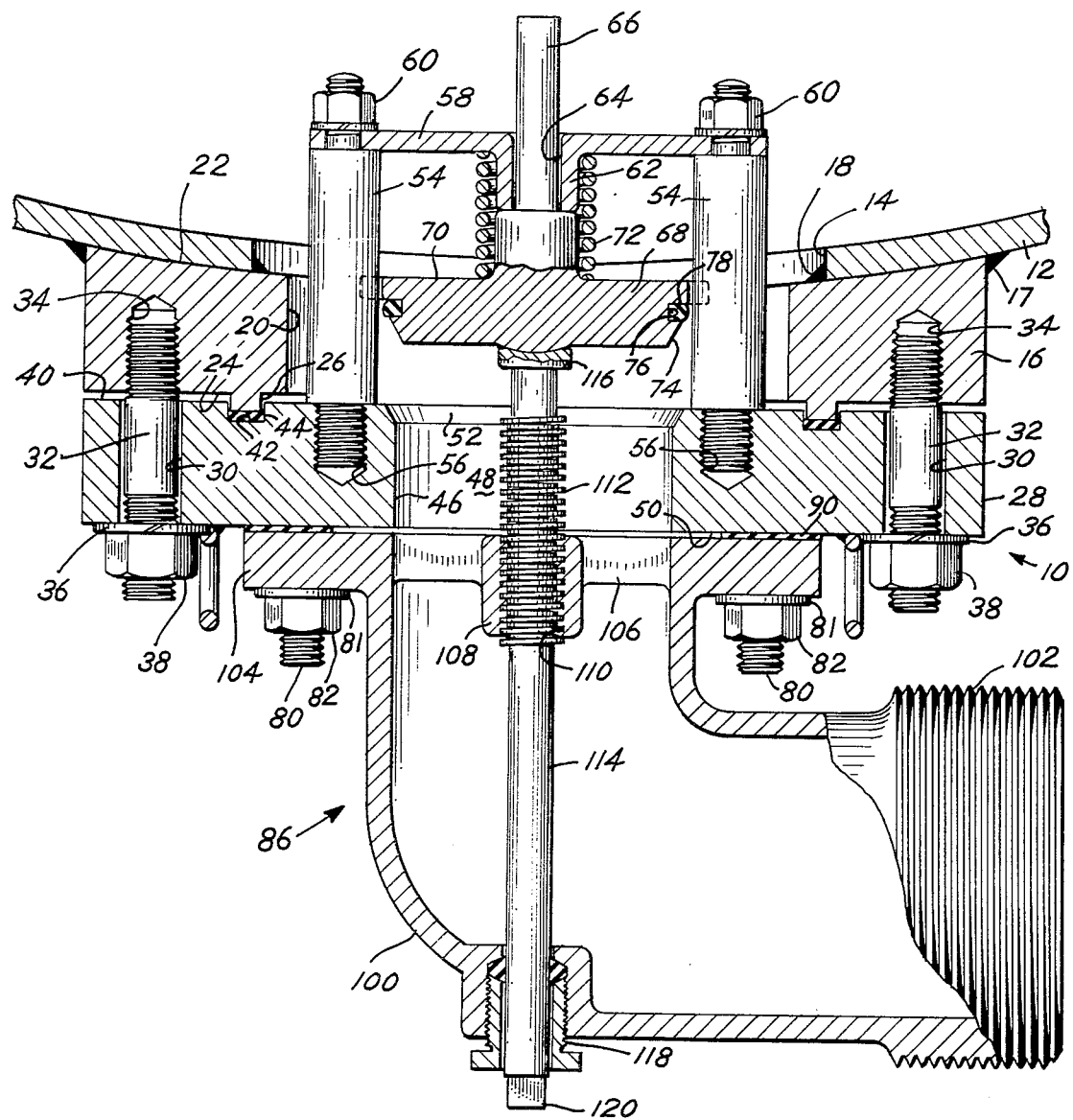
FIG. 3 is a cross sectioned elevation view of the tank and valve shown in FIG. 1, but with the transport plate removed and a loading and unloading adapter installed.

In FIGS. 1-3, one preferred embodiment of loading and unloading valve constructed in accordance with the principles of the invention is shown. The loading and unloading valve assembly, generally 10, is adapted to be mounted at the bottom of a tank or vessel shell 12 at an opening 14 in the tank shell.

A valve mounting flange 16 is secured by suitable means, such as welds 17 and 18, to the bottom of the vessel, adjacent to and encircling the opening 14 in the tank shell. The valve mounting flange 16 is preferably annular and includes an opening 20 extending through the thickness of the flange. The internal diameter of opening 20 is preferably slightly less than the diameter of the vessel opening 14 to accommodate weld 18. The upper surface of flange 16 is preferably formed to closely coincide with the exterior curvature of the vessel shell 12 adjacent opening 14, such that when the flange 16 is mounted to the underside of the vessel shell, it closely fits against the exterior of the shell to prevent leakage of the lading between surface 22 and the exterior of the shell. The lower surface 24 of the valve mounting flange is preferably planar and includes an annular flange 26, of slightly larger internal diameter than opening 20, extending about the opening and downwardly from the lower surface 24

A bottom mounting flange 28 of preferably the same external diameter as flange 16, is positioned beneath flange 16. The bottom mounting flange 28 includes a plurality of openings 30 positioned around the perimeter of the bottom mounting flange. The bottom mounting flange is mounted to flange 16 by way of threaded studs 32 which extend upwardly through openings 30 and into threaded openings 34 which are tapped into flange 16 in overlying relationship to each of the openings 30, as shown in FIGS. 1 and 3. A lock washer 36 is positioned on the other end of each of the studs 32 and a nut 38 is threaded onto each of the studs 32, such that when the nuts 38 are threaded into place, the bottom mounting flange is firmly mounted under and to flange 16.

The upper surface 40 of the bottom mounting flange 28 includes a complementary groove 42 for receipt of a suitable annular gasket 44 and annular flange 26 of the valve mounting flange 16, as shown in FIGS. 1 and 3. When the bottom mounting flange 28 is mounted in place by studs 32 to the valve mounting flange 16, the annular flange 26 will enter groove 42 and compress gasket 44, insuring a tight seal between the bottom mounting flange 28 and the valve mounting flange 16.

An enlarged opening 46 extends through the thickness of the bottom mounting flange 28 to define a chamber 48 between the upper surface 40 and the lower surface 50 of flange 28. The upper end of the chamber 48 opens through the upper surface 40 of the bottom mounting flange to opening 20 in flange 16 and opening 14 into the tank vessel and is preferably chamfered at 52.

A plurality of threaded guide posts 54 are threaded into upwardly facing threaded openings 56 in the upper surface 40 of the bottom mounting flange and in spaced relation about the chamfered opening 52. The guide posts 54 extend vertically upward from the bottom mounting flange 28 through opening 20 in flange 16 and through opening 14 and the vessel shell 12 into the vessel.

A top guide plate 58 is positioned in the vessel shell in spaced relation to the upper surface 40 of flange 28, and is secured to the tops of the guide posts 54 by nuts 60. The edges of the top guide plate are preferably cut out at 61 as shown in FIG. 2 to minimize resistance to the flow of the lading through the valve during loading and unloading. The top guide plate 58 also includes a downwardly extending, annular boss 62 having an opening 64 extending therethrough for receipt of a valve plug guide stem 66.

The guide stem 66 is integrally formed with a circular valve plug 68 at one of its ends. The valve plug 68 includes an upper surface 70, and a resilient biasing spring 72 extends between the underside of the top guide plate 58 and the upper surface 70 of the valve plug and around the exterior of boss 62. The bottom of the valve plug 68 is preferably chamfered at 74. The valve plug 68 is also grooved intermediate its height at 76 to receive a ring seal 78 for sealing the interior of the tank shell 12 from chamber 48 and the valve exterior when the valve plug is positioned in its fully downward, closed position as shown in FIG. 1.

The opening of chamber 48 in the bottom mounting flange 28 through the lower surface 50 of the mounting flange is sealed by some form of cap member which is mounted to the underside of the bottom mounting flange, as by studs 80 (which are secured to the lower surface 50 of flange 28), washers 81 and nuts 82. Such cap member may take the form of either a transport plate, generally 84 as shown in FIG. 1, or a loading and unloading adapter assembly 86 as shown in FIG. 3.

The transport plate shown in FIG. 1 preferably comprises a flat circular plate 88 having a suitable annular, flat sealing gasket 90 between its upper surface and the lower surface 50 of flange 28. This plate is primarily contemplated for use during transport of the vessel, and is to be removed during loading and unloading of the lading. To prevent loss of the plate 88 when it is removed during loading and unloading, the plate is preferably secured to the bottom mounting flange 28 by way of a chain 92 which is welded at 93 to bottom mounting flange 28. In addition, a pair of links 94 may be welded to the bottom surface 50 of flange 28 and the perimeter of plate 88 as shown in FIG. 1, to receive a padlock or other suitable device to prevent tampering with the plate during transport.

A plug 96 is also preferably threaded into an opening 98 in plate 88. Plug 96 may also be secured against loss by several links of chain 99 welded to the underside of plate 88 as shown in FIG. 1. The purpose of the plug 96 is to drain chamber 48 upon arrival of the lading at its destination. In addition, the plug 96 may also be removed to test the integrity of the valve plug 68 against leakage and/or to introduce a suitable sterilizing liquid into chamber 48, prior to transport of the lading, to protect the lading against the entry of contaminants during transport through the valve assembly.

When it is desired to load or unload the lading, the nuts 82 and washers 81 are removed along with plate 88. Even with plate 88 removed, it will be noted that if the vessel shell 12 is filled with lading, no lading will be lost because the weight of the lading, together with the action of spring 72 will urge the valve plug 68 into its downward closed position as shown in FIG. 1. This is also true if the plate 88 is accidentally sheared during transport from the bottom mounting flange 28.

After the plate 88 has been removed, a loading and unloading adapter assembly 86 is mounted in place of the plate to the lower surface 50 of the bottom mounting flange 28 on studs 80 by washers 81 and nuts 82 as shown in FIG. 3.

The adapter assembly 86 preferably comprises an elbow shaped conduit 100 which may be threaded at its terminal end 102 to provide a suitable connector for a loading or unloading material handling conduit (not shown). A flange 104 is formed integrally at the other end of the elbow conduit 100 having substantially the same external configuration as the plate 88 shown in FIG. 1.

A webbed support member 106, having a plurality of arms which are preferably formed integrally with the elbow conduit 100, extend across conduit 100. An annular boss 108 is also preferably integrally formed with the arms at the center of the arms, and a threaded opening 110 extends through the boss 108 for receipt of the threads 112 of a elongate valve biasing stem 114.

The upper end of the valve biasing stem 114 may be enlarged at 116 and is positioned so that it can bear against the underside of the valve plug 68 when the adapter assembly 100 is installed as shown in FIG. 3. The lower end of the valve biasing stem extends through the wall of the elbow conduit 100 by way of a suitable packing gland 118 or the like. The bottom end of the valve biasing stem 114 is formed at 120 for receipt of a suitable wrench or other tool for operating the biasing stem 114.

Once the loading and unloading adapter assembly 86 has been mounted to the underside of the bottom mounting flange 28 in place of transport plate 88 as shown in FIG. 3, turning of the valve biasing stem 114 will cause the stem to move upwardly and bias the valve plug 70, against the weight of the lading in the vessel shell 12 and the force of spring 72, to its open position as shown in FIG. 3.

A second preferred embodiment of loading and unloading valve constructed in accordance with the principles of the present invention is shown in FIGS. 4-7. That loading and unloading valve assembly, generally 122, is also adapted to be mounted to the bottom of a tank or vessel shell 124 at an opening 126 in the tank shell.

A valve mounting flange 128 is secured, by suitable means such as weld 130, to the bottom of the vessel, adjacent to and encircling the opening 126 in the tank shell. The valve mounting flange 128 is preferably annular and includes an opening 132 extending through the thickness of the flange. The internal diameter of opening 132 is preferably slightly less than the diameter of the vessel opening 126 to accommodate weld 130.

Figure 4:
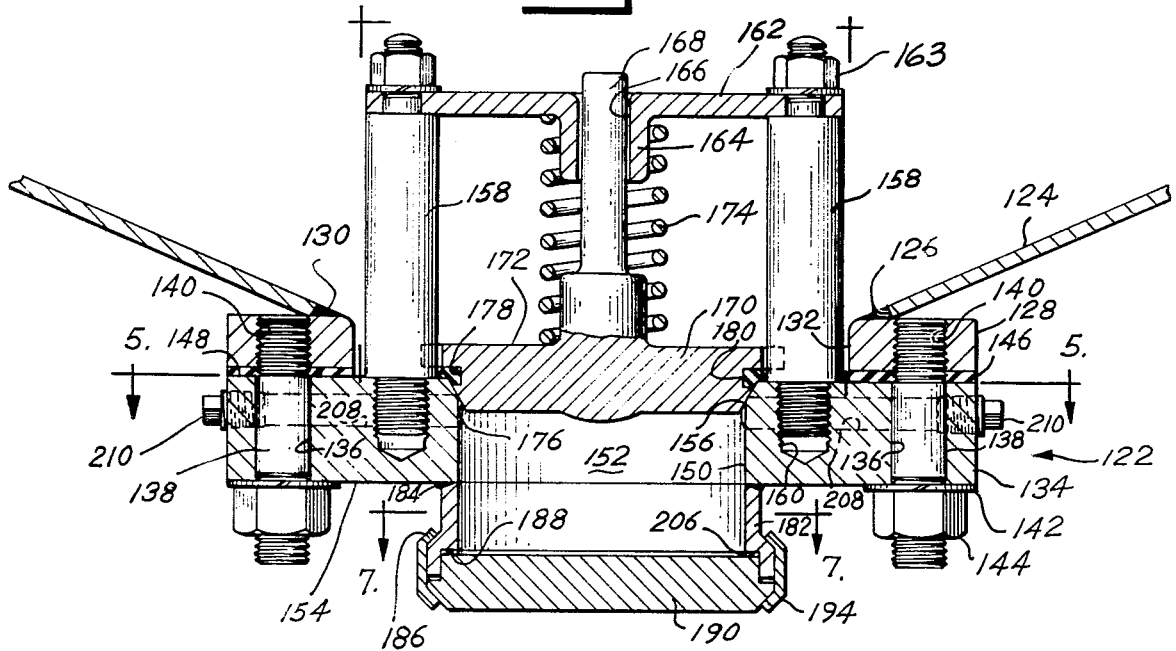
FIG. 4 is a cross sectioned elevation view of a portion of a transport tank or vessel and a second preferred embodiment of loading and unloading valve constructed in accordance with the principles of the invention and in which the valve is shown with a transport plate installed during transport.
Figure 5:
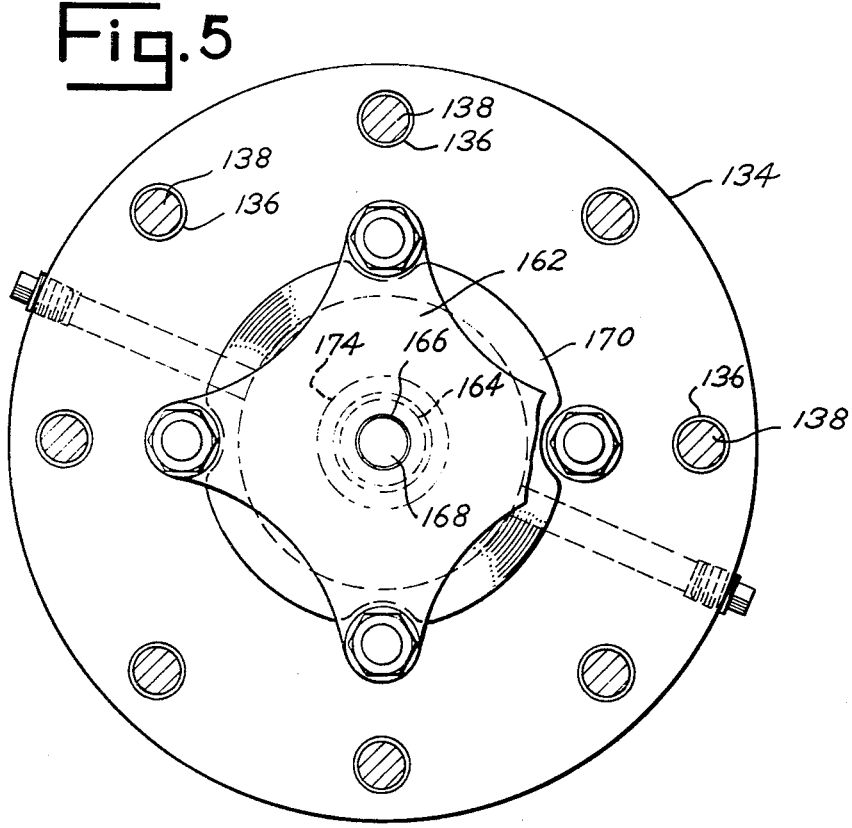
FIG. 5 is a cross sectioned plan view of the valve as viewed along line 5—5 of FIG. 4.
Figure 6:
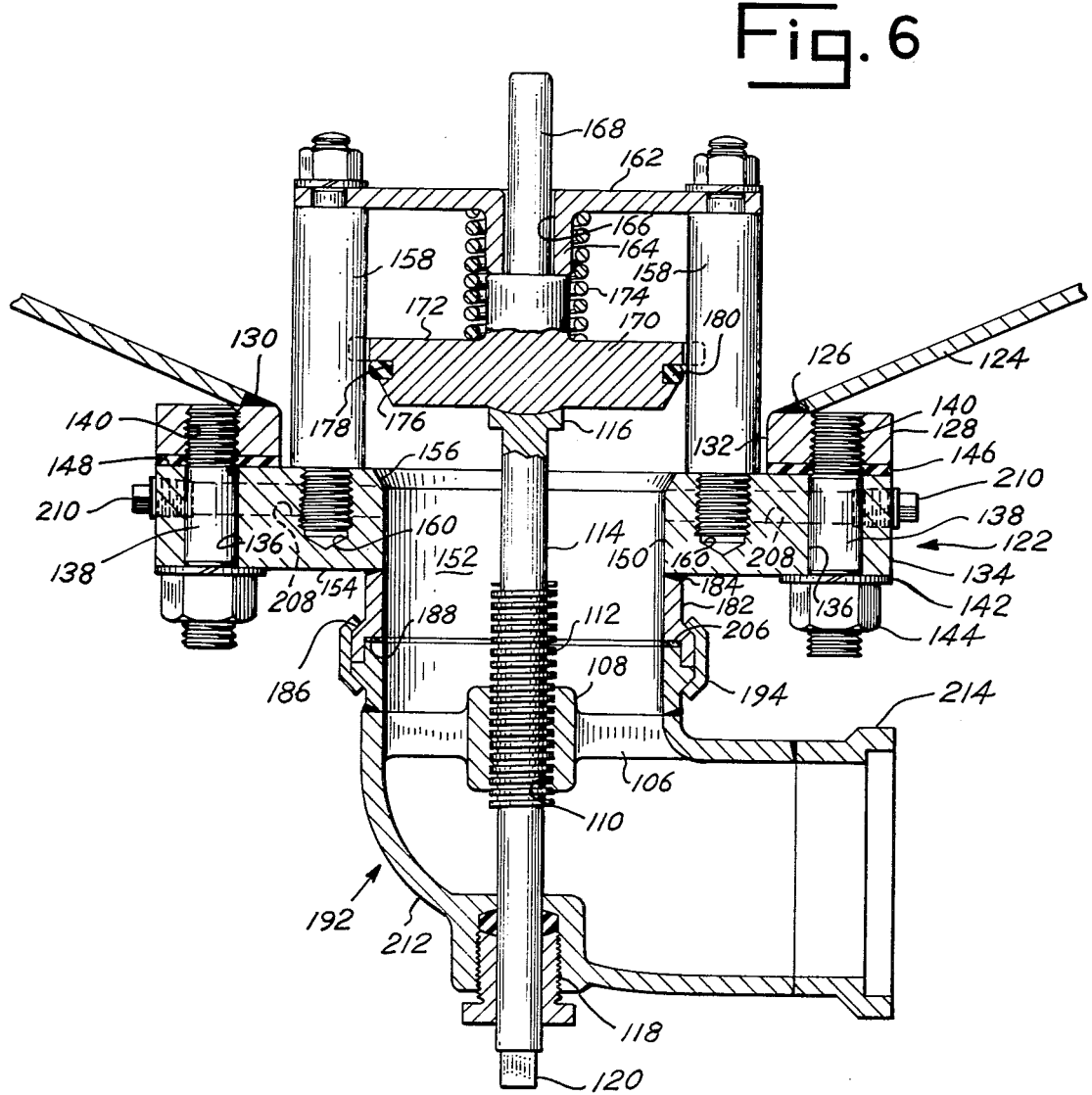
FIG. 6 is a cross sectioned elevation view of the tank and valve shown in FIG. 4, but with the transport plate removed and a loading and unloading adapter installed.

A bottom mounting flange 134, of preferably the same external diameter as flange 128, is positioned beneath flange 128. The bottom mounting flange 134 includes a plurality of openings 136 positioned around the perimeter of the bottom mounting flange. The bottom mounting flange is mounted to flange 128 by way of threaded studs 138 which extend upwardly through openings 136 and into threaded openings 140 which are tapped into flange 128 in overlying relationship to each of the openings 136, as shown in FIGS. 4 and 6. A lock washer 142 is positioned on the other end of each of the studs 138 and a nut 144 is threaded onto each of the studs 138, such that when the nuts 144 are threaded into place, the bottom mounting flange 134 is firmly mounted under and to flange 128. A suitable annular gasket 146 is also positioned between the lower side of flange 128 and the upper surface 148 of the bottom mounting flange 134 to prevent leakage between the surfaces from the tank shell 124.

A large opening 150 extends through the thickness of the bottom mounting flange 134 to define a chamber 152 between the upper surface 148 and the lower surface 154 of flange 134. The upper end of chamber 152 opens through the upper surface 148 of the bottom mounting flange to opening 132 in flange 128 and opening 126 into the tank vessel, and is preferably chamfered at 156.

A plurality of threaded guide posts 158 are threaded into upwardly facing threaded openings 160 in the upper surface 148 of the bottom mounting flange in spaced relation about the chamfered opening 156. The guide posts 158 extend vertically upward from the bottom mounting flange 134 through opening 132 in flange 128, and through opening 126 in the vessel shell 124 into the vessel.

A cut out top guide plate 162 is also positioned in the vessel in spaced relation to the upper surface 148 of flange 128 and is secured to the tops of the guide posts 158 by nuts 163. The top guide plate 162 includes a downwardly extending annular boss 164 having an opening 166 extending therethrough for receipt of a valve plug guide stem 168.

The guide stem 168 is integrally formed with a circular valve plug 170 at one of its ends. The valve plug 170 includes an upper surface 172, and a resilient biasing spring 174 extends between the underside of the valve plug and around the exterior of boss 164. The bottom of the valve plug 170 is preferably chamfered at 176. The valve plug 170 is also grooved intermediate its height at 178 to receive a ring seal 180 for sealing the interior of the tank shell 124 from chamber 152 and the valve exterior when the valve plug is positioned in its fully downward, closed position as shown in FIG. 4.

As in the previous embodiment shown in FIGS. 1-3, the opening of chamber 152 in the bottom mounting flange 134 through the lower surface 154 of the mounting flange is sealed by some form of cap member which is mounted to the underside of the bottom mounting flange. As shown in this embodiment, FIGS. 4 and 6, an annular sleeve 182 is welded to the undersurface of flange 134 at 184. The exterior of sleeve 182 is slightly enlarged at 186 at its lower end and the interior of the sleeve includes an annular step 188. The cap member, as in the embodiment shown in FIGS. 1-3, may also preferably take the form of either a transport plate, generally 190, as shown in FIG. 4, or a loading and unloading adapter assembly 192, as shown in FIG. 6.

Figure 7:
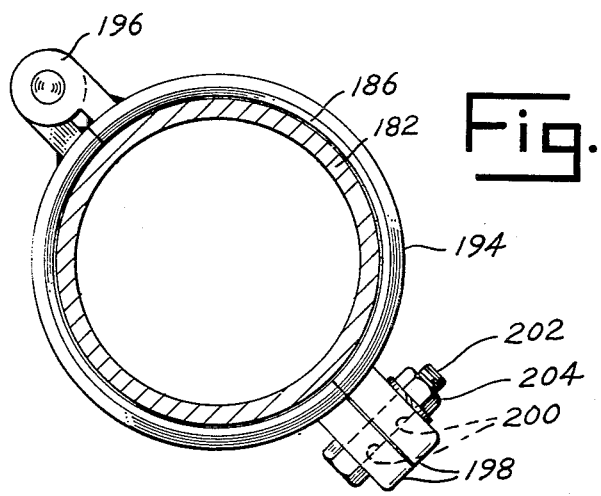
FIG. 7 is a cross sectioned plan view of the valve as viewed along line 7—7 of FIG. 4 and showing the mounting assembly for the transport plate.

Either the transport plate 190 or, alternatively, the adapter assembly 192 is mounted to the lower portion of sleeve 182 by a concave split ring assembly 194. Referring particularly to FIG. 7, the pair of split rings 194 are hinged at 196. Each of the rings includes a flange 198 positioned on the opposite side of the sleeve from the hinge 196. Flanges 198 include an opening 200 for receiving a locking bolt 202 and nut 204 or a padlock (not shown).

The plate 190 is mounted to the lower end of sleeve 182 by first positioning an annular gasket 206 against step 188 and inserting the plate 190 into sleeve 182 until it rests against the annular gasket. The split rings 194, in their unlocked condition, are then placed around the enlarged portion of the lower end of sleeve 182 and the perimeter of the plate 190 as shown in FIG. 4, and are drawn together and bolted by bolt 202 and nut 204.

The transport plate 190 shown in FIG. 4 does not include a drain plug as in the preceding embodiment. Instead, one or more bored passages 208 extend radially into the bottom mounting flange 134. Each of the passages 208 leads to chamber 152 at one end, and the outer end is plugged by a threaded plug 210. Passages 208 have the purpose of introducing a sterilizing liquid into chamber 152 to fill the chamber with the liquid during transport and also to test the integrity of the valve plate 170 against leakage.

As in the preceding embodiment, even if plate 190 is removed, either intentionally or due to accidental shearing, when the vessel shell 124 is filled with lading, no lading will be lost, because the weight of the lading, together with the action of spring 174, will urge the valve plug 170 into its downward closed position as shown in FIG. 4.

When it is desired to load or unload the lading, the nut 204 and bolt 202 are removed, split rings 194 are opened, and the transport plate 190 is removed. The adapter assembly 192 is then mounted, in place of the plate 190, to the bottom enlarged end of sleeve 182 by use of the split rings 194.

The adapter assembly 192 is substantially identical to the adapter assembly 86 shown in FIGS. 1-3. The adapter assembly 192, preferably comprises an elbow shaped conduit 212 which, instead of being threaded at its terminal end 214, is stepped and enlarged to act as a connector for a loading or unloading material handling conduit (not shown). The manner of coupling the material handling conduit to the terminal end 214 is by a split ring assembly similar to the split ring coupling previously described and shown in FIG. 7.

The remaining elements of the adapter assembly 192, i.e. the webbed support member, valve biasing stem, etc., are identical to the corresponding elements in adapter 86 shown in FIG. 3. Accordingly, these elements have been given reference numerals in FIG. 6 identical to the corresponding elements shown in FIG. 3.

Once the loading and unloading adapter assembly 192 has been mounted to the underside of the bottom mounting flange 134 by way of sleeve 182, in place of transport plate 190 as shown in FIG. 6, turning of the valve biasing stem 114 will cause the stem to move upwardly and bias the valve plug 170 against the weight of the lading in the vessel shell 124 and the force of spring 174, to its opened position as shown in FIG. 6.

From the foregoing it will be seen that the loading and unloading valve of the present invention is mounted primarily on the interior of the vessel shell and presents only a minimum projection outside of the shell. Moreover, the adapter assemblies 86 and 192 need not, and should not, be mounted during transport, but instead the transport plates 84 and 190 should be used during transport. Thus, the exterior of the valve of the present invention may project as little as 5 inches from the tank shell, whereas prior valves projected as much as 17 inches. Due to such minimum, low profile, the likelihood of accidental shearing of the valve from the shell, and consequent lading contamination and/or loss, is minimized. Even if the adapter assemblies are accidentally left in place and sheared during transport, the lading will be protected against contamination and/or loss by the valve plug of the present invention which remains closed due to lading and spring features. Moreover, because the plug is closed in the valve of the present invention during transport of the lading, the chamber between the valve plug and transport plate may be filled with a sterilizing liquid to further minimize the possibility of contamination.

It will readily be understood that various elements appearing in the embodiment shown in FIGS. 1-3 may be incorporated into the embodiment shown in FIGS. 4-7, or vice versa. For example, the drain plug 96 may be included in the transport plate 190. Conversely, the sterilizing fluid passages 208 may be incorporated in the bottom mounting flange 28 shown in FIG. 1. And, the split ring assembly shown in FIG. 7 may be used in place of the nut and bolt mounting 80, 81, 82 shown in FIG. 1.

It will also be understood that the embodiments of the present invention which have been described are merely illustrative of a few of the applications of the principles of the invention. Numerous modifications may be made by those skilled in the art without departing from the true spirit and scope of the invention.

What is claimed is:

1. A tank loading and unloading valve comprising:
   flat flange means having a pair of substantially flat, planar surfaces on each side thereof,
   mounting means for mounting one planar surface of said flange means adjacent an opening in the tank,
   a chamber in said flange means, said chamber extending through said flange means and opening to the opposite surfaces of said flange means,
   valve means removably mounted to said one of said planar surfaces, said valve means including plug means for movement into a first position in which said plug means normally closes said opening in said flange means at said one planar surface, and to a second position in which said plug means opens said opening, said valve means also including a valve stem extending from one side of said plug means and guide means for said plug means, said valve stem and guide means extending into the opening in the tank,
   plate means for closing said opening at the other surface of said flange means when the tank is in transit,
   adapter means comprising connector means for connecting a material handling conduit to said opening at said other surface and said chamber, said adapter means including biasing means operable from the side of said valve adjacent said other surface of said flange means for contacting said plug means on its side opposite said valve stem to bias said plug means to said second position when said adapter means is mounted adjacent said opening at said other surface in place of said plate means, and
   mounting means for removably mounting said plate means when said valve is in transit and said adapter means in place of said plate means when the tank is to be loaded or unloaded adjacent the other surface of said flange means in covering relationship to said opening in said flange means at said other surface and said chamber.

2. the valve of claim 1, wherein said biasing means comprises screw means which contacts said valve plug means.

3. The valve of claim 1 including drain means in said plate means.

4. The valve of claim 1 including passage means in said flange means communicating with said chamber.

5. The valve of claim 1 including said tank and said tank opening in combination therewith, said valve plug means extending through said tank opening and into said tank, whereby the projection of said other surface of said flange means beyond the outer wall of said tank is only minimal.

6. The valve of claim 1 including means for injecting a sterilizing fluid into said chamber when said plate means is mounted to said flange means.

7. The valve of claim 1 wherein said valve plug means includes guide means mounted to said one surface of said flange means for guiding said valve plug means for movement between said first and second positions, and spring means for biasing said valve plug means to said first position.

8. The valve of claim 1, wherein said biasing means comprises screw means which contacts said valve plug means, and further including said tank and said tank opening in combination therewith, said valve plug means extending through said tank opening and into said tank, whereby the projection of said other surface of said flange means beyond the outer wall of said tank is only minimal, said valve plug means also including guide means mounted to said one surface of said flange means and extending therefrom into said vessel opening for guiding said valve plug means for movement between said first and second positions, and spring means for biasing said valve plug means to said first position.

9. The valve of claim 8 including means for injecting a sterilizing fluid into said chamber when said plate means is mounted to said flange means.

10. The valve of claim 1 wherein said plate means and adapter means are mounted directly to the planar surface of said flange means opposite said one planar surface.

* * * * *